Feb. 20, 1951     E. E. CRUMP     2,542,182
COMBINED RADAR AND COMMUNICATION SYSTEM
Filed Oct. 25, 1945     2 Sheets-Sheet 1
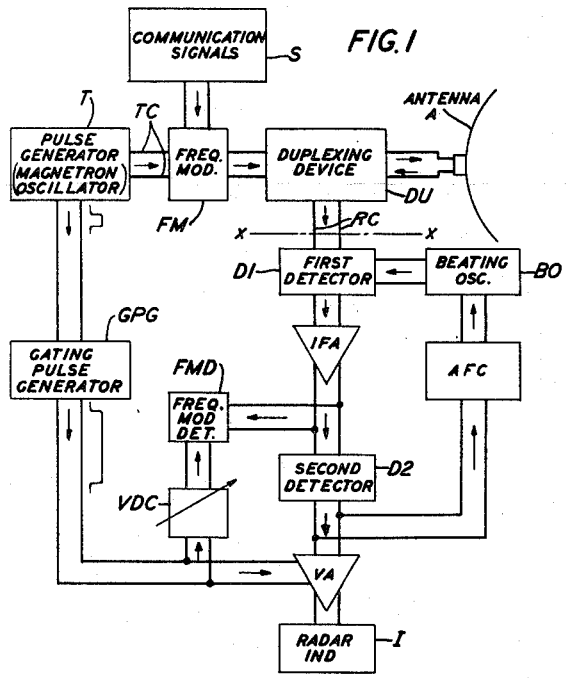
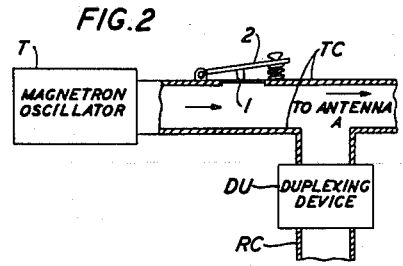
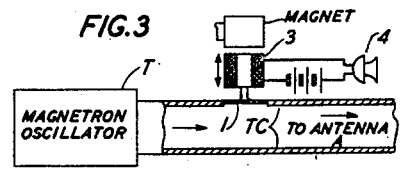
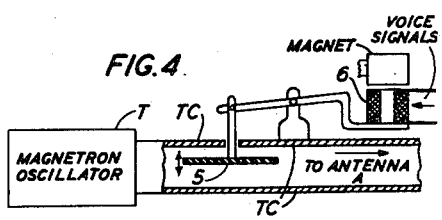
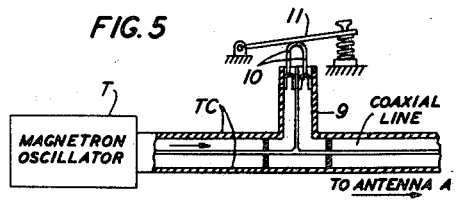
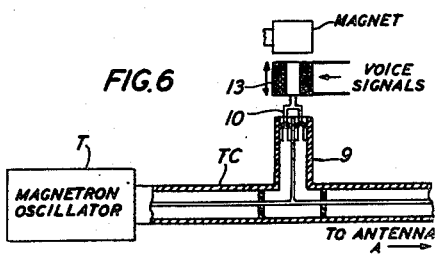
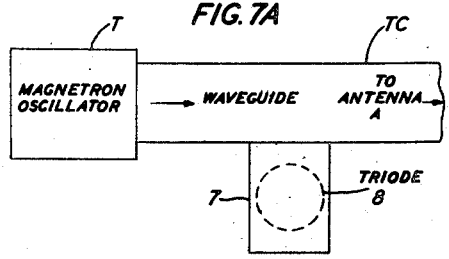
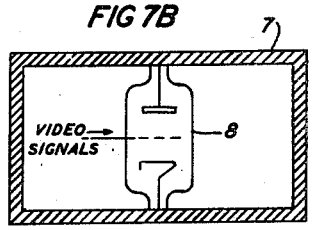
INVENTOR
E. E. CRUMP
BY
Earl C. Laughlin
ATTORNEY Feb. 20, 1951 E. E. CRUMP 2,542,182
COMBINED RADAR AND COMMUNICATION SYSTEM
Filed Oct. 25, 1945 2 Sheets-Sheet 2
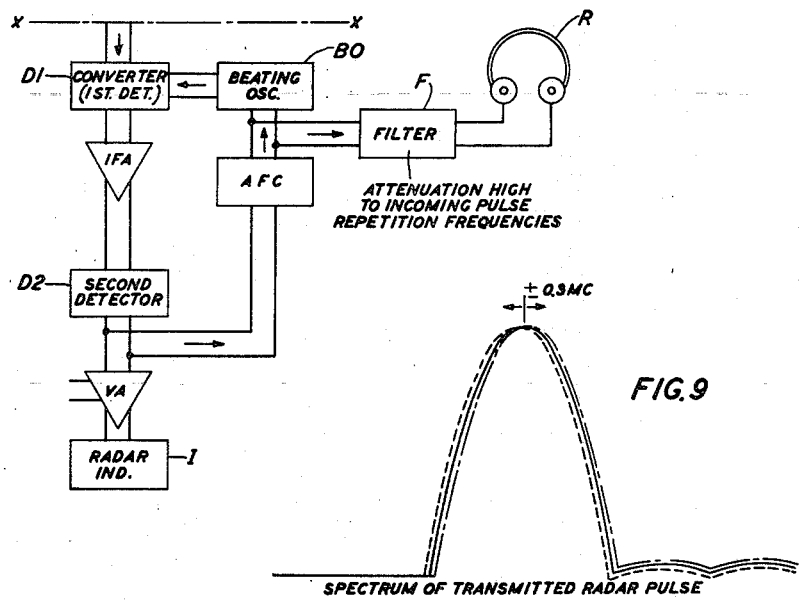
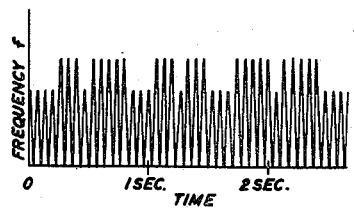
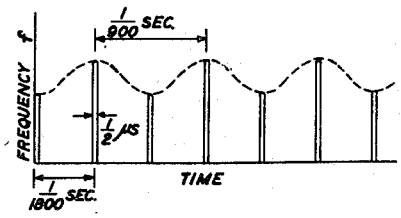
INVENTOR
E. E. CRUMP
BY
Earl C. Laughlin
ATTORNEY Patented Feb. 20, 1951

2,542,182

UNITED STATES PATENT OFFICE 2,542,182

COMBINED RADAR AND COMMUNICATION SYSTEM

Elmo E. Crump, East Orange, N. J., assignor to Bell Telephone Laboratories, Incorporated, New York, N. Y., a corporation of New York Application October 25, 1945, Serial No. 624,514

1 Claim. (Cl. 343—5)

The invention relates to electric wave transmission systems and particularly to combined radar and signal communication systems.

The usual object locating system of the pulse reflection type employing ultra-high frequency or radio waves, commonly called a radar system, includes at an observation point, which may be located at a land station or on a ship, airplane or other movable carrier, a transmitter comprising means for generating trains of very short signal pulses of high frequency energy at predetermined time intervals; a common antenna for radiating the trains of pulses into the surrounding air transmission medium, and for picking-up return pulses, which may be termed radio echoes, reflected from objects (targets) in that medium on which the radiated pulses impinge; a tuned receiver for detecting the picked-up signal echoes; and a measuring and indicating circuit for comparing the detected signal echoes on a time basis with the outgoing signal pulses as a measure of the distances to the objects causing the echoes.

When several ships or other carriers equipped wtih such radars are operating in a given region, such as a war combat zone, it is desirable to provide some means of communication between them to transmit information on the location of targets, or cruising or other instructions without danger of this information being picked-up by enemy or other unauthorized observers in this region or zone.

An object of the invention is to modify radar equipment located at stations relatively distant from each other so as to obtain in addition to the usual radar functions of such equipment relatively secret communication channels between the stations.

A more specific object is to provide relatively secret two-way communication channels between several ships, airplanes or other movable carriers, or between such carriers and a fixed station, equipped with radar devices, with the addition of simple and economical equipment.

These objec's are attained in accordance with the invention by the provision of means in each radar transmitter for frequency modulating the spectrum of the outgoing high frequency signal pulses in accordance with communication signals to be transmitted, and the provision in each radar receiver of suitable means for selectively detecting the communication signals from the frequency-modulated pulses incoming from other distant radars, picked up by the associated local antenna. This frequency modulation in accordance with one embodiment of the invention is obtained by "pulling" slightly or "wobbling" the frequency of the transmitting pulse generator, for example, by varying the output impedance of the latter by any one of a number of different methods to be described. The amount of frequency modulation is made small in order not to appreciably interfere with the normal function of the radar, i. e., object location.

The two-way frequency modulation communication channels thus provided are effectively secret inasmuch as the transmitted signals cannot be successfully detected by eavesdroppers without the use of a frequency modulation receiver employing a centimeter beat oscillator, which, because of its relatively high cost and complexity, would not be available to the ordinary observer. Also, by employing portions of the usual radar equipment for necessary parts of the signal communication equipment, the radars may be modified in accordance with the invention, with the addition of a relatively small amount of inexpensive apparatus to provide a highly secret two-way communication channel. Where combat operations are conducted in enemy waters, it is highly advantageous to have such a communcation channel available between ships in this region equipped with radar devices when radio (but not radar) silence must be observed.

The various features and objects of the invention will be better understood from the following detailed description when read in conjunction with the accompanying drawings in which:

Fig. 1 shows in block schematic form one known type of radar device modified in accordance with the invention;

Figs. 2 to 6, 7A and 7B show various frequency modulation schemes which may be employed in the system of the invention shown in Fig. 1;

Fig. 8 shows a modified form of frequency modulation receiver which may be employed in the system of Fig. 1; and Fig. 9 to 11 show curves used in connection with a description of the operation of the circuits of the invention.

Fig. 1 shows in simplified form the circuit of a radar device of known type modified in accordance with the invention to provide a two-way communication channel. This same modified equipment would be mounted on each of several ships or aircraft, and perhaps at one or more land stations as well, so as to provide in addition to the usual radar functions for each, a secret communcation channel between any two of them when they are within a given distance range from each other. This radar device as shown in Fig. 1 comprises a transmitting circuit TC and a receiving circuit RC coupled in a duplex arrangement with a common transmitting and receiving antenna A by the duplexing device DU. The transmitting circuit TC includes a pulse generator T, which may be a magnetron oscillator of the resonant cavity type disclosed in the United States Patent 2,063,342, issued December 8, 1936, to A. L. Samuel, adapted to generate at a given repetition rate, trains of extremely short pulses of high frequency electrical energy, which are transmitted over the circuit TC to the antenna A for radiation thereby. The receiving circuit RC may be of the double-detection, superheterodyne type shown including a converter or first detector D1 with an associated source BO of beating oscillations of a suitable intermediate frequency, followed by an intermediate frequency amplifier IFA, a second detector or demodulator D2, a video amplifier VA and a radar measuring and indicating device I, which may be a cathode-ray oscilloscope having its operation synchronized with the transmitting pulse generator T in any suitable manner.

The radar receiving circuit RC, as shown, also includes an automatic frequency control circuit AFC, which may be of the general type disclosed in United States Patent 2,121,103, issued June 21, 1938, to S. W. Seeley, connected between the output of the second detector D2 and the source of beating oscillations BO, adapted for automatically regulating the frequency of the latter so as to effectively compensate for variations in the frequency of the incoming waves supplied from the antenna A to the input of the receiver circuit RC. Also, a "gating" pulse generator GPG which may be, for example, of the multivibrator type such as disclosed in the copending patent application of R. O. Wise, Serial No. 507,804, filed October 27, 1943, which issued as United States Patent No. 2,428,058 on September 30, 1947, connected between the transmitting pulse generator T and the video amplifier VA, operates under control of the pulses generated by that transmitter to produce a delayed positive enabling pulse such that when it is applied to the video amplifier VA normally biased to cut-off, it will cause that amplifier to be enabled only for the periods in which reflected echoes of the outgoing pulses are being received in the receiving circuit RC.

The common transmitting and receiving antenna A is usually of the highly directive type, and by the use of suitable rotary joints in its connections to the circuits TC and RC and suitable driving means (not shown) may be adapted for rotation in a horizontal or a vertical plane, or both, to enable the use of the radar for locating targets, such as ships on the surface of the sea, or moving airplanes above or below its horizontal position, within a given distance range from the ship or other carrier on which the radar is located. The duplexing device DU, provided to enable the use of the radar for radiating signal pulses and receiving incoming echo pulses with a single antenna A, may be in the form of an automatic transmit-receive switch of any of the known types, which, to prevent injury to sensitive receiving equipment such as a crystal converter, is adapted to effectively prevent any appreciable portions of the necessarily high amplitude pulse energy passing from the output of the transmitting pulse generator T over the circuit TC to the antenna A during radar transmitting intervals from being diverted into the receiving circuit RC, while allowing substantially all of the relatively low amplitude incoming echo pulse energy received from the antenna A during radar receiving intervals to enter the receiving circuit.

In the normal operation of the radar for object location, the radar device as described above operates to provide its normal function, i. e., object location, in the following manner. It is assumed that the transmitter T of the radar system is turned on so that radio pulses of very short duration are being sent at frequent intervals from the antenna A in the form of a radio beam. When the rotating radio beam from the antenna A strikes an object, usually referred to as a target, in its path, a portion of its energy will be reflected as echoes back towards the observation point. A portion of this energy will be intercepted by the antenna A and will be transformed by it into electrical pulse energy. The received electrical pulse energy or echo pulses will pass through the duplexing unit DU to the converter or first detector D1 in the receiving circuit RC in which it will be first combined with the beating oscillations supplied from the beating oscillator BO to step it down to an intermediate frequency. The echo pulses in the output of detector D1 will be amplified in the intermediate frequency amplifier IFA and then will be detected in the second detector D2 of the receiving circuit RC. A portion of the detected pulse energy in the output of detector D2 will be fed back through the automatic frequency control circuit AFC to the beating oscillator BO to provide the required regulation of the frequency of the latter to compensate for variations in the frequency of the received incoming pulse energy entering the receiving circuit RC. The other portion of the detected pulse energy in the output of the second detector D2, usually referred to as the video signal or signals, after further amplification in the video amplifier VA, which has been enabled for the receiving pulse interval by the operation of the gating pulse generator GPG as previously described, will be compared on a time basis with the outgoing pulse energy in the measuring and indicating circuit I to determine the location of the targets causing the echoes.

To provide a secret communication channel in accordance with the invention, the outgoing high frequency signal pulses generated by the transmitter T are frequency modulated before being supplied to the antenna A for radiation, by means of a suitable frequency modulator FM in the transmitting circuit TC, with communication signals from the associated communication signal source S. This frequency modulation may be accomplished by "pulling" the frequency of the transmitting pulse generator T slightly so as to provide a small "wobble" in the spectrum of the transmitted pulses, as indicated by the curve of Fig. 9. Where the transmitting frequency is 3000 megacycles per second this frequency modulation would be in the order of ±0.3 megacycle per second.

To detect the communication signals frequency-modulated on incoming high frequency radar pulses transmitted by a similarly modified radar at an observation station on another ship or carrier, or at a land station, within a given distance range, picked up by the local antenna A and diverted into the associated radar receiving circuit RC, a frequency modulation detector FMD of any suitable type is connected to a suitable point in that circuit, for example, to the output of the intermediate frequency amplifier IFA as shown. This detector FMD should include suitable filtering means (not shown) having high attenuation to the repetition rate frequency employed by the distant radars so that it may be operated only by the communication signals. The frequency repetition rates of the local and distant radar stations must be substantially the same to provide proper operation of the two-way communication channel between these stations. The detector FMD may be "gated" so as to be enabled only during signal pulse receiving intervals thereby effectively cutting out noise during the long intervals between received pulses. This may be accomplished, as indicated diagrammatically, by utilizing the pulse output of the local radar gating pulse generator GPG to render the frequency modulation detector FMD operative only during pulse receiving intervals, for example, by overcoming the normal negative blocking bias on a vacuum tube in the latter, at the repetition rate of the local transmitting pulse generator T and thus at the approximate repetition rate of the pulse generator of the distant radar, and then adjusting the final instant of gate occurrence by adjustment of the variable delay circuit VDC for the actual received pulse.

Any one of a variety of alternative arrangements may be utilized for the frequency modulator FM and the associated communication signal source S in the radar system of Fig. 1. Where a section of metal-walled pipe wave guide, say of rectangular cross-section, is employed for the transmitting circuit TC connecting the transmitting pulse generator (magnetron oscillator) T to the common transmitting and receiving antenna A, any one of the alternative arrangements shown in Figs. 2 to 4, 7A and 7B may be used; and when a section of coaxial line is employed for the transmitting circuit TC, either one of the arrangements illustrated in Figs. 5 and 6 may be used.

In the arrangement of Fig. 2, a thin metal diaphragm 1 is inserted in one side wall of the wave guide at a point an optimum distance from the output of the pulse generator T, and telegraph keying means 2 is utilized to alternately push in and pull out this diaphragm to change the transverse dimension normal to the lines of electromotive force of the outgoing wave pulses in the wave guide between two limiting values. This will cause corresponding variations in the output impedance of the pulse generator T to "pull" or "wobble" the frequency of the outgoing high frequency pulses between two limiting values slightly above and below the normal frequency, as indicated in Fig. 9. By operating the keying means 2 so as to alternately maintain the frequency of the pulse generator T at the higher and lower frequency values for desired periods of time, the transmitted pulse wave may be frequency-modulated with a desired telegraph message, as indicated diagrammatically by the characteristic curve of Fig. 10. In the arrangement of Fig. 3, the diaphragm 1 in the transmitting wave guide TC is pushed in and out for varying intervals of time under control of the electromagnetic coil means 3, similar to that used in ordinary loudspeakers, supplied with voice signals from the associated telephone transmitter 4 to correspondingly vary the output impedance and thus the frequency of the transmitting pulse generator T, so as to frequency modulate the spectrum of the outgoing high frequency wave pulses in accordance with a spoken message. Fig. 11 shows the frequency variation with time for such a voice frequency modulating arrangement, where the highest voice frequency equals 900 cycles per second and the pulse repetition rate of the radar pulse generator T is 1800 cycles per second. As indicated, the time duration of each of the outgoing wave pulses is about a half microsecond.

In the arrangement of Fig. 4, the outgoing high frequency wave pulses are frequency modulated by varying the transverse position of a dielectric strip or plunger 5 within the interior of the wave guide transmitting circuit TC between two limiting values for varying time intervals under control of an electromagnet 6, similar to that illustrated in Fig. 3, supplied with the voice signals to be transmitted, so as to provide corresponding changes in the output impedance of the pulse generator T and thus to wobble or pull the frequency of that generator in a manner similar to that described in connection with the arrangement of Fig. 3.

In the arrangement illustrated in Figs. 7A and 7B, the main wave guide TC has a right angle branch 7 closed at its outer end, at an optimum distance from the output of the transmitting pulse generator T, and an electron discharge device 8, which may be a triode as shown, has its plate and filament electrodes shunted across the cross-section of the branch wave guide 7 at an intermediate point. Video signals (signals of the video type, that is, extending over a wide frequency range beyond the audio frequency range) applied to the control grid-cathode circuit of the tube 8 will cause variations of the impedance shunting the branch wave guide 7 to correspondingly vary the load impedance on the transmitting pulse generator T and thus frequency-modulate the outgoing wave pulses in accordance with the video communication signals. The electron discharge device 8 is placed in the branch wave guide 7 at a distance from the main wave guide TC such as to give maximum frequency modulation. The advantage of this tube arrangement over the diaphragm or plunger frequency modulating arrangements previously described is that the former does not require any mechanical movement and thus the arrangement is adapted to pull the frequency of the transmitting pulse generator T at the video frequencies.

In the alternative frequency modulation arrangements of Figs. 5 and 6, the main coaxial line TC connecting the transmitting pulse generator T to the antenna A has a right-angle branch 9 connected thereto at an optimum distance from the output of the generator T, which branch is closed at its outer end by a movable plunger 10. The position of the plunger 10 may be varied to change the effective length of the coaxial line branch 9 between upper and lower limiting values for different time intervals by operation of the associated telegraph keying means 11. This will provide corresponding variations in the output load impedance of the transmitting pulse generator T causing the frequency of the latter to be pulled slightly in either direction from its normal value in the two operating positions of the keying means 11. Thus, the spectrum of the outgoing high frequency pulses generated by the transmitting pulse generator T will be frequency modulated, as shown by the characteristic frequency-time characteristic of Fig. 10, to transmit a telegraph message. The plunger 10 is provided with frequency traps shown so to reduce distortion in the transmitted high frequency pulses due to high frequency leakage. The frequency modulating arrangement of Fig. 6 differs from that of Fig. 5 merely in that the movement of the movable plunger 10 is controlled by a coil arrangement 13, similar to that illustrated in Fig. 3, supplied with voice signals, instead of by manual keying means as used in the arrangement of Fig. 5, so that the outgoing wave pulses generated by the pulse generator T are frequency modulated in accordance with the supplied voice signals to transmit a spoken message.

Fig. 8 shows schematically an alternative arrangement which can be used for detecting the communication signals from the voice-signal frequency-modulated echo pulse waves generated by distant radars picked up by the antenna A of the local radar and diverted into its receiving circuit RC. As shown, the automatic frequency control circuit AFC employed in the radar receiver for the purpose described above is used to perform a part of the functions of a frequency modulation receiver, and the only additional apparatus required to detect the communication signals from the incoming waves entering the radar receiving circuit RC is a filter F having high attenuation to the pulse repetition rate frequencies employed in the transmitting circuit of the distant radars similar to that shown in Fig. 1, and low attenuation to incoming signal frequency components, having its input connected across the output of the automatic frequency control circuit AFC in the local radar, and a pair of headphones R connected to the output of the filter F for reproducing voice signals in its output. Thus, known radar equipment with very slight modifications can be adapted for use to provide a highly secret two-way communication channel.

The frequency modulation schemes described above are applicable to other types of radar.

Various modifications of the circuits illustrated and described which are within the spirit and scope of the invention will be apparent to persons skilled in the art.

What is claimed is:

In combination with a radar system including a source of high frequency radar pulses, an antenna for radiating said pulses and a hollow pipe wave guide line having a main, straight portion connecting said source to said antenna for supplying said pulses thereto, a source of video signals and means to frequency modulate the spectrum of the outgoing radar pulses with said video signals to provide a communication channel, comprising a branch portion of said wave guide line extending at right angles to said main portion thereof at an optimum distance from said source of pulses, and closed at its outer end, an electric discharge device having its discharge path connected in shunt with the cross-section of said branch wave guide line portion at an optimum distance from said main wave guide line portion, and having a control grid circuit, and means to apply the signals from said source of video signals to said control grid circuit of said device to cause variations in the shunting impedance across said branch wave guide line portion for varying time intervals proportional to the instantaneous amplitudes of the applied signals, these variations in said shunting impedance causing proportional variations in the effective load on said source of pulses and thus of the spectrum of the outgoing radar pulses generated thereby.

ELMO E. CRUMP.

REFERENCES CITED

The following references are of record in the file of this patent:

UNITED STATES PATENTS

| Number | Name | Date |
| --- | --- | --- |
| 1,908,254 | Kaar | May 9, 1933 |
| 2,151,323 | Hollman | Mar. 21, 1939 |
| 2,174,701 | Koch | Oct. 3, 1939 |
| 2,253,589 | Southworth | Aug. 26, 1941 |
| 2,381,181 | Price | Aug. 7, 1945 |
| 2,407,199 | Wolff | Sept. 3, 1946 |
| 2,408,425 | Jenks | Oct. 1, 1946 |
| 2,414,431 | Alford | Jan. 21, 1947 |
| 2,436,640 | Fredholm et al. | Feb. 24, 1948 |

FOREIGN PATENTS

| Number | Country | Date |
| --- | --- | --- |
| 112,967 | Australia | May 1, 1941 |